(12) United States Patent
Roesner

(10) Patent No.: US 7,458,260 B2
(45) Date of Patent: Dec. 2, 2008

(54) FLUID LEVEL DETECTION USING RF

(75) Inventor: Bruce B. Roesner, San Diego, CA (US)

(73) Assignee: ClarIDy Solutions, Inc., San Diego, CA (US)

( * ) Notice: Subject to any disclaimer, the term of this patent is extended or adjusted under 35 U.S.C. 154(b) by 356 days.

(21) Appl. No.: 11/269,429

(22) Filed: Nov. 7, 2005

(65) Prior Publication Data

US 2007/0101809 A1    May 10, 2007

(51) Int. Cl.
*G01F 23/00*    (2006.01)
(52) U.S. Cl. .................................. 73/290 V
(58) Field of Classification Search ............ 73/290 V, 73/290 R
See application file for complete search history.

(56) References Cited

U.S. PATENT DOCUMENTS

| | | | | |
|---|---|---|---|---|
| 2,869,108 A | * | 1/1959 | Smith, Jr. ........................ 367/3 |
| 4,119,860 A | * | 10/1978 | Gooley ......................... 250/577 |
| 5,842,374 A | * | 12/1998 | Chang ........................ 73/290 R |
| 6,959,598 B2 | * | 11/2005 | Peterson et al. ........... 73/290 V |
| 7,219,545 B2 | * | 5/2007 | Salzmann et al. ......... 73/304 R |
| 7,270,001 B2 | * | 9/2007 | Betz ......................... 73/290 V |

* cited by examiner

*Primary Examiner*—Hezron E. Williams
*Assistant Examiner*—Rodney T Frank
(74) *Attorney, Agent, or Firm*—Fish & Richardson P.C.

(57) ABSTRACT

The present disclosure includes systems and techniques relating to fluid level detection. In general, in some implementations, a fluid level detector includes a radio frequency transmitter, and a plurality of radio frequency detectors arranged to receive radio frequency signals from the radio frequency transmitter when above a fluid level. The radio frequency transmitter and one or more multiple transmitting antennas can be configured to transmit ultra high frequency (UHF) RF signals. The radio frequency detectors can be radio frequency antennas, and the fluid level detector can include circuitry configured to receive signals from the radio frequency antennas. For example, the circuitry can include a decode array (e.g., a two dimensional diode array) coupled with the antennas, and a decoder (e.g., digital logic) coupled with the decode array.

21 Claims, 3 Drawing Sheets

FLUID LEVEL DETECTION USING RF

BACKGROUND

The present application describes systems and techniques relating to fluid level detection.

Various techniques have been used previously to detect a fluid level in a fluid (liquid) container or reservoir. Prior techniques have included floating an object in the fluid (e.g., water) and then monitoring the vertical position of the floating object. This typically involves placing the object in the fluid inside the container or reservoir and also involves various moving parts. Prior techniques have also included visual detection of the level of the fluid directly using light reflected by the fluid.

SUMMARY

The present disclosure includes systems and techniques relating to fluid level detection using radio frequency (RF) signals. According to an aspect, a fluid level detector includes a radio frequency transmitter, and a plurality of radio frequency detectors arranged with respect to a span so as to indicate a fluid level by receiving, from the radio frequency transmitter, radio frequency signals that pass through an RF-transparent region of the span. The fluid level detector can include transmitting antennas coupled with the radio frequency transmitter and arranged to send the radio frequency signals. Moreover, the radio frequency transmitter and the transmitting antennas can be configured to transmit the radio frequency signals at a frequency between 300 Mega Hertz and 300 Giga Hertz.

The radio frequency detectors can include radio frequency antennas, and the fluid level detector can further include circuitry configured to receive signals from the radio frequency antennas. The circuitry can include a decoder configured to determine a current fluid level based on the radio frequency signals received by the radio frequency antennas. The circuitry can further include an analog decode array, which can include a two dimensional array of fluid level lines and decode lines. The number of the decode lines can be less than or equal to half a number of the fluid level lines. The analog decode array can further include select lines and diodes, each fluid level line being coupled with at least one select line and at least one decode line by at least two diodes; the analog decode array can include a diode array.

According to another aspect, a system includes a fluid container, a radio frequency transmitter, and a plurality of radio frequency detectors arranged with respect to the fluid container so as to indicate a fluid level by receiving, from the radio frequency transmitter, radio frequency signals that pass through an RF-transparent region of the fluid container. The system can further include transmitting antennas coupled with the radio frequency transmitter and arranged to send the radio frequency signals. The fluid container can include many different fluid storage apparatus, including a fuel tank (e.g., in a motor vehicle).

According to yet another aspect, a method includes transmitting radio frequency signals to a plurality of radio frequency antennas arranged across various fluid levels of a fluid reservoir, receiving the radio frequency signals with a subset of the radio frequency antennas, and determining a fluid level in the fluid reservoir based on the radio frequency signals received with the subset. The transmitting can involve transmitting in an ultra high frequency (UHF) range. The receiving can involve detecting the radio frequency signals with the subset of antennas, and rectifying a result of the detecting to create a direct current voltage on fluid level lines corresponding to the subset of antennas. The determining can involve selecting a proper subset of multiple fluid level lines to examine, and decoding the fluid level in the fluid reservoir based on one or more of the subset of the radio frequency antennas that also correspond to one or more of the proper subset of the fluid level lines.

Using the systems and techniques described, one or more of the following advantages may be realized. Moving parts may be eliminated, and a low cost fluid level detector may be realized. The fluid level detector can both reliably and accurately detect the level of fluids in various containers and reservoirs. Using ultra high frequency (UHF) RF signals, many types of fluids can be detected; most liquids (including water and gasoline) are opaque to UHF RF electromagnetic radiation. The height of the fluid level to be measured can be essentially unlimited, and the accuracy over the entire range can be constant.

Details of one or more implementations are set forth in the accompanying drawings and the description below. Other features and advantages may be apparent from the description and drawings, and from the claims.

DRAWING DESCRIPTIONS

Like reference symbols in the various drawings indicate like elements.

DETAILED DESCRIPTION

Figure 1:
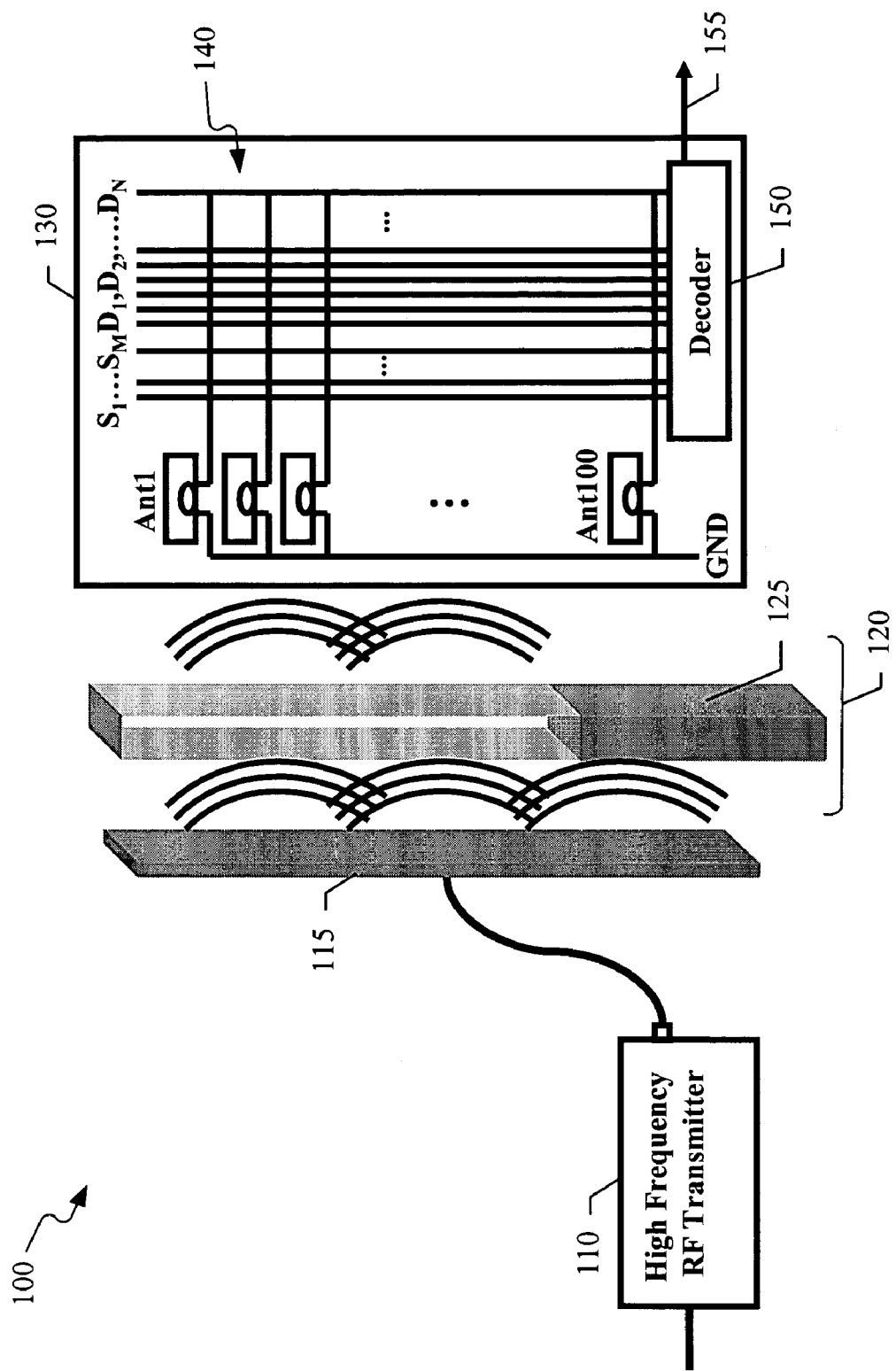
FIG. 1 shows a fluid level detection system.

As used herein, the term "fluid" means a liquid fluid. FIG. 1 shows a fluid level detection system 100. The system 100 includes a radio frequency (RF) transmitter 110. The RF transmitter 110 is configured to generate high frequency RF signals. These signals can be directed toward a container 120 (e.g., bottle, tank, etc.) including a fluid 125 (e.g., water, fuel, etc.) using one or more transmit antennas 115 (e.g., an array of transmitting antennas, which may have less power level control than a typical RFID (Radio Frequency Identification) transmitter). The RF transmitter 110 can be configured to transmit in the UHF range and above (e.g., about 400 MHz, in the range $3\times10^2 \ldots 3\times10^3$ MHz, or $3\times10^2 \ldots 3\times10^5$ MHz). In general, the RF transmitter 110 can be configured to transmit a high frequency RF signal that is absorbed by the fluid 125 of interest.

Multiple RF detectors can be arranged across various fluid levels of the container 120. For example, multiple RF receive antennas (e.g., an array of RF antennas Ant1 ... Ant100) can be arranged vertically with respect to the container 120. The system 100 positions sensing antennas opposite the RF transmitter on either side of the fluid container 120. The RF carrier is blocked by the fluid but is transmitted in the region above the fluid, which is typically occupied by an air gap or vacuum. Thus, comparing where the RF signal is received versus where it is not received, allows monitoring fluid levels in the container.

An example fluid level detector 130 includes RF receive antennas Ant1 ... Ant100, a decode array 140, a decoder 150, and an output 155. The receive antennas Ant1 ... Ant100 are tuned antennas that detect the RF carrier, which can then be rectified with diodes creating a direct current (DC) voltage on the horizontal lines (the fluid level lines) going into the decode array 140. The decode array 140 can include select lines $S_1 \ldots S_M$ and decode lines $D_1 \ldots D_N$. The decode array 140 can be an analog decode array and can be used to decode which vertical lines $D_1 \ldots D_N$ are at a high voltage (e.g., no water present) as compared to those at a low voltage (e.g., below water).

The decoder 150 can include digital logic on an integrated circuit (IC) chip. The decoder 150 can control the select lines $S_1 \ldots S_M$ to select a group of antennas for reading, and then compare the decode lines $D_1 \ldots D_N$ to determine the fluid level. (Note that the use of select lines is not essential as the system can operate without select lines, with just one set of decode lines covering the range of fluid levels.) The output 155 provides the decoded output of the measured value. This output may be expressed in many different formats (e.g., a value corresponding to the level line, such as 7 of 100, or a value corresponding to an amount of liquid in the container, such as a value in liters looked up in a table stored in the decoder 150).

Figure 2:
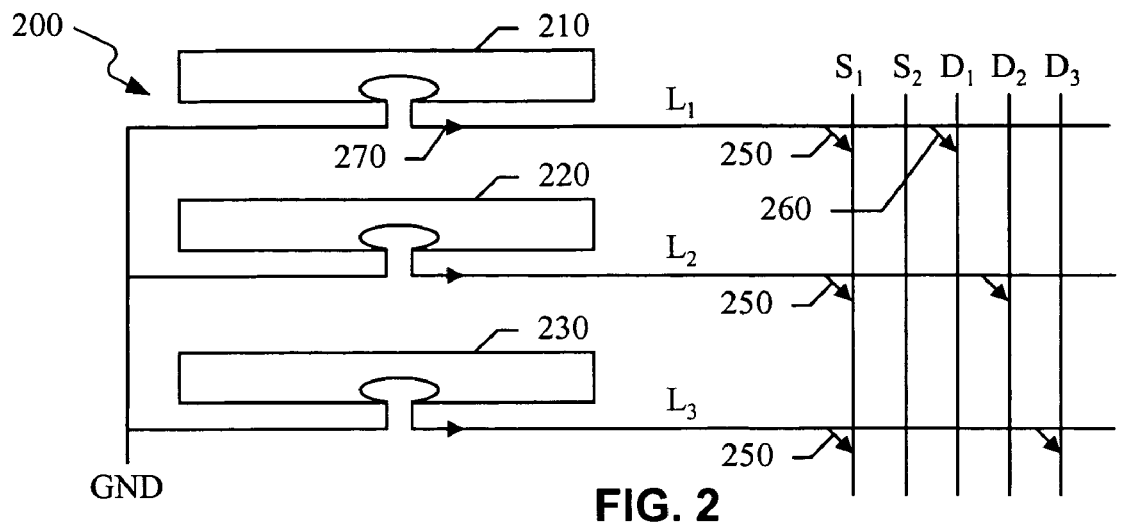
FIG. 2 shows example radio frequency antennas and a decode array.

FIG. 2 shows an example schematic 200 including radio frequency antennas and a decode array, and showing how the circuit can be implemented. Multiple antennas 210, 220, 230 are arranged at various levels of a fluid in a container or reservoir. The antennas 210-230 have associated fluid level lines $L_1$-$L_3$. If the fluid is water, and the water level is between antenna 220 and antenna 230, antennas 210 and 220 would receive the RF power, thereby elevating the voltage on lines $L_1$ and $L_2$.

A select line $S_1$ can be allowed to go high to select lines $L_1$-$L_3$, due to diodes 250. To select a different group of antennas, $S_1$ can be pulled low so that $L_1$-$L_3$ would be pulled low, thus deselecting these lines. When $S_1$ is high and fluid level lines $L_1$-$L_3$ are selected, a subset of the decode lines $D_1$-$D_3$ go high due to staggered diodes, such as a diode 260 for decode line $D_1$. Note that the subset of the antennas could be all of the antennas in the case of a completely empty container or reservoir.

The decode array 140 can be a diode array as shown in FIG. 2, with three diodes per fluid level line (i.e., per antenna). A third diode 270 can be used on line $L_1$ connecting to the antenna. Such diodes can be used on one or more of the level lines for isolation, if needed. These isolation diodes on the level lines can prevent the lines from adding capacitance to the antenna node, which may detune the antenna such that the antenna does not operate properly.

Figure 3:
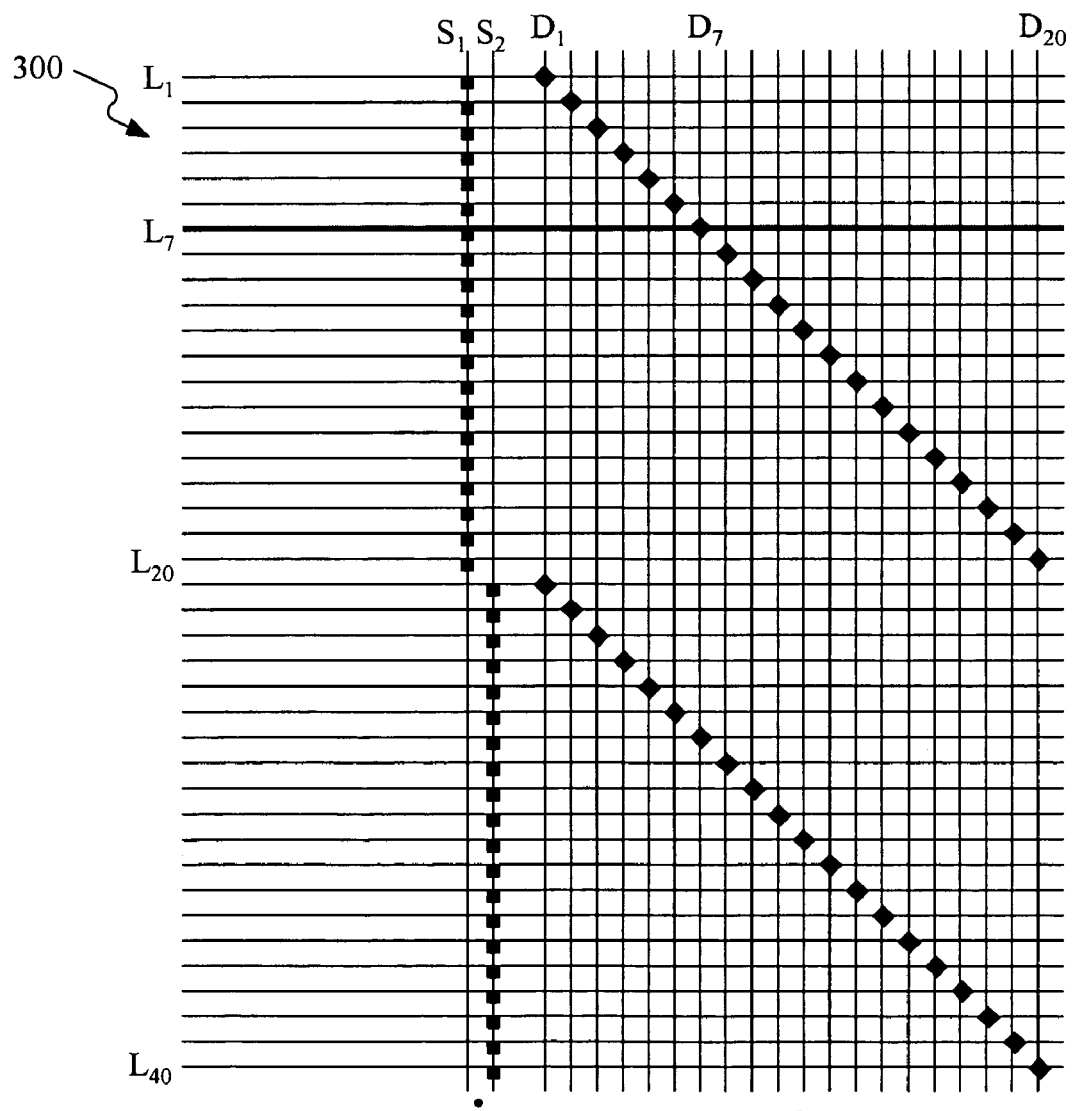
FIG. 3 shows another example decode array.

FIG. 3 shows another example decode array 300. In FIG. 3, the dots represent diodes connecting the two lines shown. Select lines $S_1$ and $S_2$ are used to select groups of L lines through the diodes. The individual lines identified as D lines are then used to sense the voltage on the L lines through the diodes. As the fluid level rises, the voltage on the L lines goes low since RF fails to reach more of the antennas.

In the decode array 300, forty different levels can be sensed by selecting one of two groups. Addition levels are possible by adding additional groups and select lines, and alternatively, no select lines need be used, such as when the number of level lines matches the number of measure levels. If the fluid level is at a level such that the antenna at level 7 is just above the water, $L_7$ will be high. When the bottom 20 devices are selected through $S_2$ ($S_1$ pulled low and $S_2$ allowed to go high), there is no energy reaching the antennas so lines $D_1$ through $D_{20}$ are all low. Then $S_1$ is selected ($S_1$ allowed to go high and $S_2$ pulled low). When monitoring $D_1$ through $D_{20}$, lines $D_1$ through $D_7$ will be high while $D_8$ through $D_{20}$ are low. This information can then be decoded to indicate that the water level is just below $L_7$.

Figure 4:
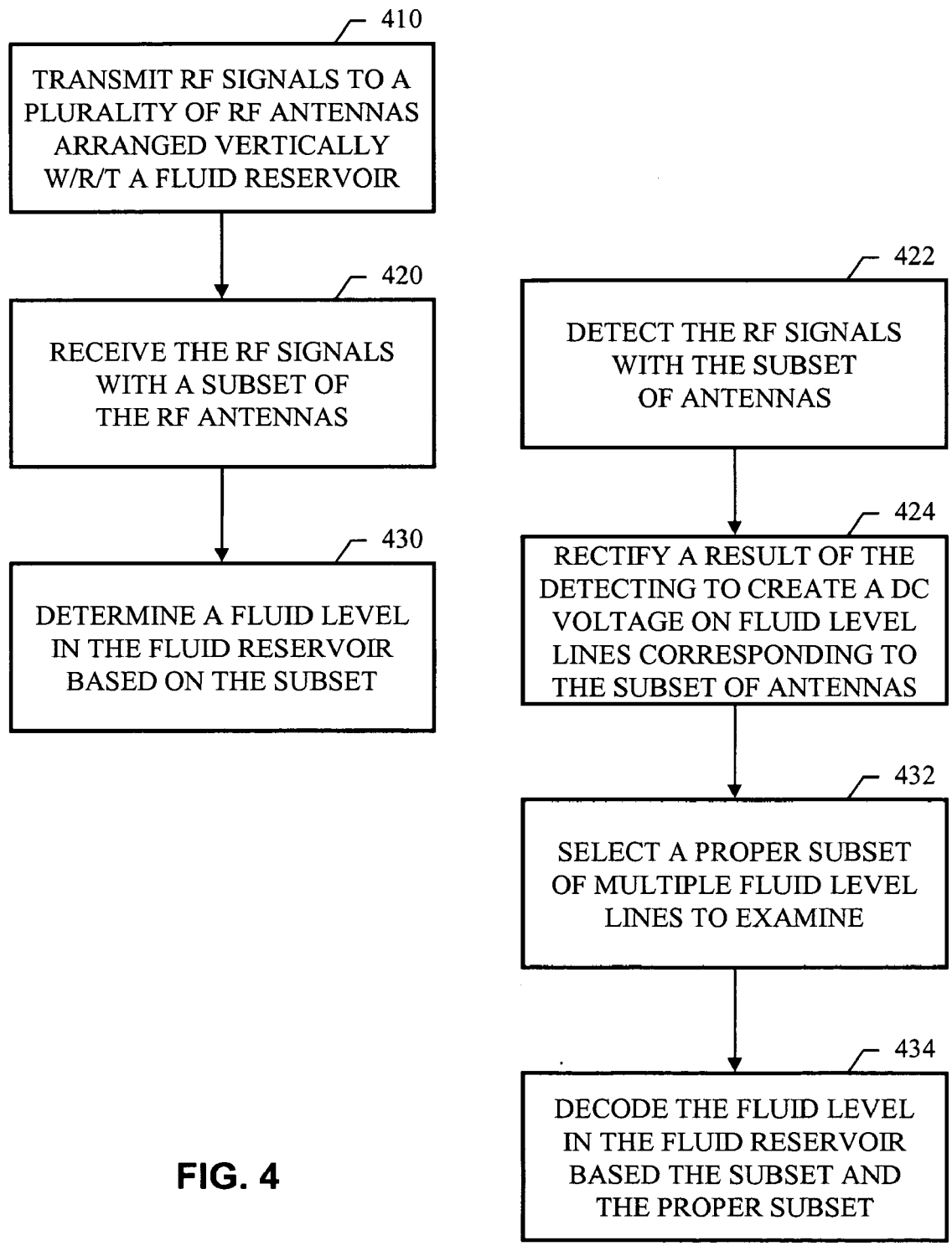
FIG. 4 shows a process of detecting a fluid level in a fluid reservoir.

FIG. 4 shows a process of detecting a fluid level in a fluid reservoir. Radio frequency signals are transmitted to a plurality of radio frequency antennas at 410. The radio frequency antennas are arranged across various fluid levels of a fluid reservoir, such as described above. The radio frequency signals are received with a subset of the radio frequency antennas at 420. This subset could be all, none, or a portion of the receive antennas, and this can be done over multiple select and detect operations, such as using the select lines described above. Then, a fluid level in the fluid reservoir is determined based on the subset at 430.

The transmitting can involve transmitting in a UHF range. Moreover, the receiving and determining can involve multiple operations each. For example, the radio frequency signals can be detected at 422 with the subset of antennas, and a result of the detecting can be rectified at 424 to create a direct current voltage on fluid level lines corresponding to the subset of antennas. The determining can involve selecting a proper subset of multiple fluid level lines to examine at 432, and decoding the fluid level in the fluid reservoir at 434 based on one or more of the subset of the radio frequency antennas that also correspond to one or more of the proper subset of the fluid level lines.

Various processes described above, and the functional operations described in this specification, can be implemented in electronic circuitry, or in computer hardware, firmware, software, or in combinations of them, such as the structural means disclosed in this specification and structural equivalents thereof, including potentially a program (stored in a machine-readable medium) operable to cause one or more programmable machines including processor(s) (e.g., a computer) to perform the operations described. It will be appreciated that the order of operations presented is shown for the purpose of clarity in this description. No particular order may be required for these operations to achieve desirable results, and various operations can occur simultaneously.

A few embodiments have been described in detail above, and various modifications are possible. For example, the present systems and techniques can be used in applications where a wide measuring range may be desirable, such as when measuring water levels for lakes and rivers (e.g., during flood conditions). Moreover, the present systems and techniques can be readily used in applications involving fine level measurements and/or active data collection for digital bookkeeping; for example, monitoring the level of alcoholic beverages, where discrepancies with billed amounts can cost good deal of money.

Thus, other embodiments may be within the scope of the following claims.

What is claimed is:

1. A fluid level detector comprising:
   a radio frequency transmitter; and
   a plurality of radio frequency detectors arranged with respect to a span so as to indicate a fluid level by receiving, from the radio frequency transmitter, radio frequency (RF) signals that pass through an RF-transparent region of the span;
   wherein the radio frequency transmitter is configured to transmit the RF signals at a frequency between 300 Mega Hertz and 300 Giga Hertz.

2. The fluid level detector of claim 1, further comprising transmitting antennas coupled with the radio frequency transmitter and arranged to send the radio frequency signals.

3. The fluid level detector of claim 1, wherein the radio frequency detectors comprise radio frequency antennas, the fluid level detector further comprising circuitry configured to receive signals from the radio frequency antennas.

4. The fluid level detector of claim 3, wherein the circuitry comprises a decoder configured to determine a current fluid level based on the radio frequency signals received by the radio frequency antennas.

5. The fluid level detector of claim 4, wherein the circuitry further comprises an analog decode array.

6. The fluid level detector of claim 5, wherein the analog decode array comprises a two dimensional array of fluid level lines and decode lines, wherein a number of the decode lines is less than or equal to half a number of the fluid level lines.

7. The fluid level detector of claim 6, wherein the analog decode array further comprises select lines and diodes, each fluid level line being coupled with at least one select line and at least one decode line by at least two diodes.

8. The fluid level detector of claim 6, wherein the analog decode array comprises a diode array.

9. A system comprising:
a fluid reservoir;
a radio frequency transmitter; and
a plurality of radio frequency detectors arranged with respect to the fluid reservoir so as to indicate a fluid level by receiving, from the radio frequency transmitter, radio frequency (RF) signals that pass through an RF-transparent region of the fluid reservoir;
wherein the radio frequency transmitter is not electrically coupled with the plurality of radio frequency detectors.

10. The system of claim 9, further comprising transmitting antennas coupled with the radio frequency transmitter and arranged to send the radio frequency signals.

11. The system of claim 10, wherein the radio frequency transmitter and the transmitting antennas are configured to transmit the radio frequency signals at a frequency between 300 Mega Hertz and 300 Giga Hertz.

12. The system of claim 9, wherein the radio frequency detectors comprise radio frequency antennas, the system further comprising circuitry configured to receive signals from the radio frequency antennas.

13. The system of claim 12, wherein the circuitry comprises a decoder configured to determine a current fluid level based on the radio frequency signals receive by the radio frequency antennas.

14. The system of claim 13, wherein the circuitry further comprises an analog decode array.

15. The system of claim 14, wherein the analog decode array comprises a two dimensional array of fluid level lines and decode lines, wherein a number of the decode lines is less than or equal to half a number of the fluid level lines.

16. The system of claim 15, wherein the analog decode array further comprises select lines and diodes, each fluid level line being coupled with at least one select line and at least one decode line by at least two diodes.

17. The system of claim 9, wherein the fluid reservoir comprises a fuel tank.

18. A method comprising:
transmitting radio frequency signals to a plurality of radio frequency antennas arranged across various fluid levels of a fluid reservoir;
receiving the radio frequency signals with a subset of the radio frequency antennas; and
determining a fluid level in the fluid reservoir based on the radio frequency signals received with the subset.

19. The method of claim 18, wherein the transmitting comprises transmitting in an ultra high frequency (UHF) range.

20. The method of claim 18, wherein the receiving comprises:
detecting the radio frequency signals with the subset of antennas; and
rectifying a result of the detecting to create a direct current voltage on fluid level lines corresponding to the subset of antennas.

21. The method of claim 18, wherein the determining comprises:
selecting a proper subset of multiple fluid level lines to examine; and
decoding the fluid level in the fluid reservoir based on one or more of the subset of the radio frequency antennas that also correspond to one or more of the proper subset of the fluid level lines.

* * * * *